United States Patent [19]

Buchmüller et al.

[11] 4,279,626

[45] Jul. 21, 1981

[54] APPARATUS FOR SEPARATING THE GAS WHICH EVAPORATES DURING THE TRANSFER OF LOW-BOILING LIQUIFIED GASES

[75] Inventors: Jürgen Buchmüller; Peter Nobis, both of Krefeld; Wolfgang Volker, Dusseldorf, all of Fed. Rep. of Germany

[73] Assignee: Messer Griesheim GmbH, Frankfurt am Main, Fed. Rep. of Germany

[21] Appl. No.: 154,064

[22] Filed: May 28, 1980

[30] Foreign Application Priority Data

Jun. 7, 1979 [DE] Fed. Rep. of Germany ....... 2923078

[51] Int. Cl.³ .............................................. B01D 19/00
[52] U.S. Cl. ...................................... 55/204; 55/159; 55/267; 62/55
[58] Field of Search ............. 55/159, 204, 267, 459 R; 62/55

[56] References Cited

U.S. PATENT DOCUMENTS

| | | | |
|---|---|---|---|
| 2,857,979 | 10/1958 | Van Dijck | 55/459 R X |
| 3,044,270 | 7/1962 | Biever | 62/55 |
| 3,206,939 | 9/1965 | Wilson | 62/55 |
| 3,360,947 | 1/1968 | Fretwell et al. | 62/55 X |
| 3,391,787 | 7/1968 | Salomon | 55/459 R X |
| 3,631,654 | 1/1972 | Riely et al. | 55/159 |

*Primary Examiner*—Kathleen J. Prunner

[57] ABSTRACT

An apparatus for separating the gas which evaporates during the transfer of low-boiling gases includes a porous hollow body which is supplied with the gas-liquid mixture to be separated and arranged inside an insulated vessel having discharge lines for the gas and liquid phase. The porous hollow body is cylindrical and concentrically around the discharge line for the liquid phase and is installed in the vessel cover by means of a pipe and an inner non-porous extension with an annular space therebetween to which the gas phase discharge line is connected.

6 Claims, 1 Drawing Figure

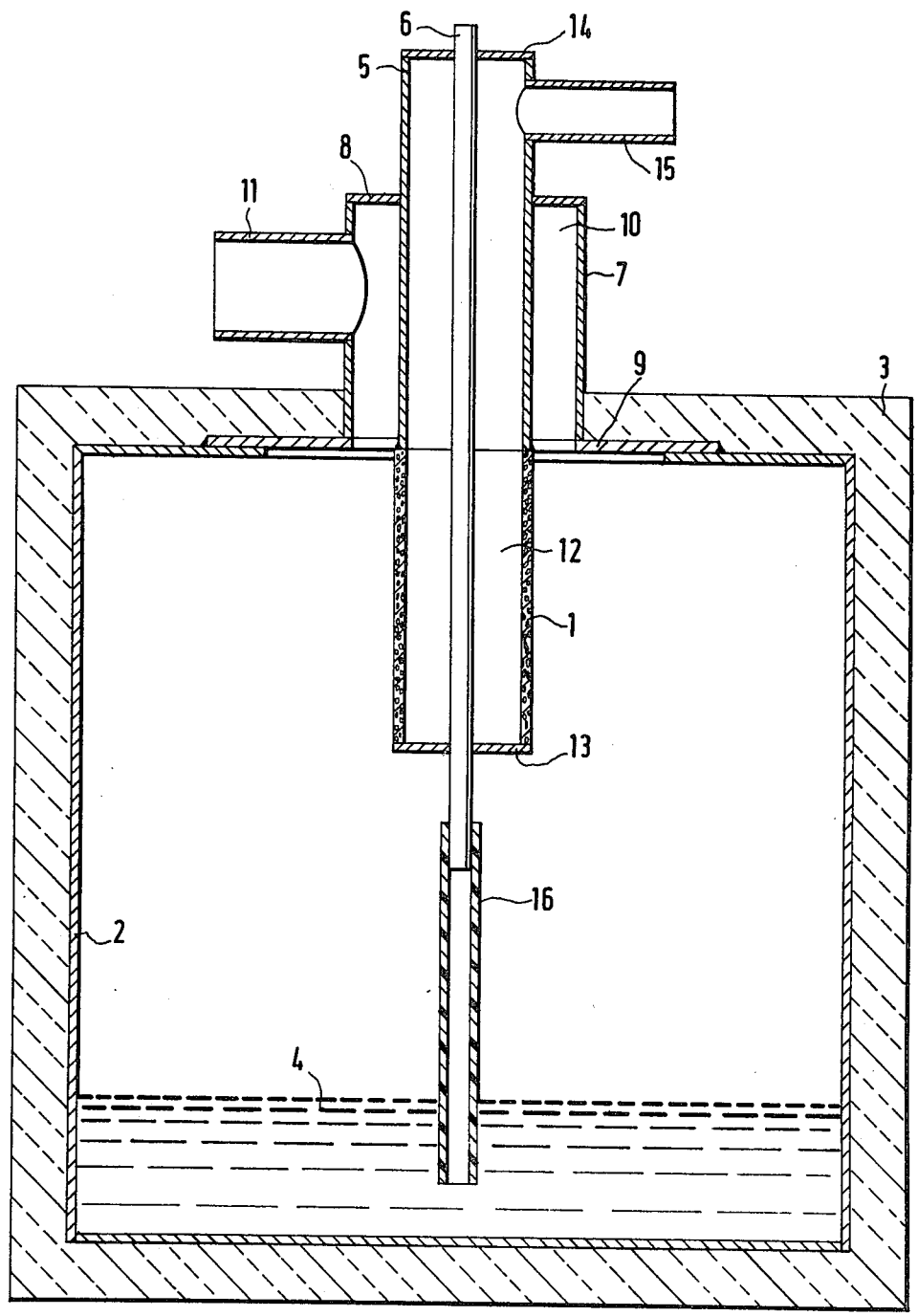

APPARATUS FOR SEPARATING THE GAS WHICH EVAPORATES DURING THE TRANSFER OF LOW-BOILING LIQUIFIED GASES

BACKGROUND OF INVENTION

The invention relates to an apparatus for separating the gas which evaporates during the transfer of low-boiling liquified gases.

Low-boiling gases such as oxygen, nitrogen and argon are stored and transferred in liquid state for economic reasons. They are used as a cooling medium in many processing methods. The low-boiling liquified gas is then usually in a boiling state. It cannot be avoided that heat from the outside flows into the transfer line. Moreover, heat is also generated in the transferred liquid as a result of friction losses. Since the liquid is in a boiling state, an amount of liquid gas corresponding to the amount of heat evaporates.

A mixture of liquid and gas is, therefore, transferred. This can lead to an undersupply of low-boiling liquified gas at the consumption location. Moreover, the regulating system for the liquid gas supply is overcharged, this sets up vibrations.

In order to eliminate this deficiency, phase separators are used for separating the evaporated gas from the gas which remained liquid. Such phase separators concern, in principle, vessels into which the gas-liquid mixture is fed and where it is separated. The liquid phase and the gas phase are separately withdrawn from these vessels. In order to prevent that too much liquid phase in the form of very fine droplets is discharged with the gas phase, which equals a loss in liquid gas, the gas velocities in the vessel must be kept low. The vessels used as phase separators must, therefore, have a large volumn construction; they are consequently expensive since especially the necessary insulation is very costly. Moreover, additional evaporation losses occur as a result of the large vessel size. A phase separator of this type is shown, for example, in German Pat. No. 26 47 961.

It is known from U.S. Pat. No. 3,206,939 to use a porous hollow body as a phase separator. This has the advantage that the liquid phase emerges in the form of large drops from the porous hollow body and falls down into the catch vessel. These large drops cannot be carried along by the gas phase as a result of which the catch vessel can have a small volume construction. The evaporation losses are, however, still relatively high since a total of three lines, namely the supply line for the gas-liquid mixture and the discharge lines for the gas phase and the liquid phase must be connected to the catch vessel. In order to reduce these evaporation losses, a phase separator consisting of a porous hollow body is arranged in the catch vessel of German Preliminary Application No. 27 43 131 in such a way that all lines are led through a common flange connection into the catch vessel from above. The insulation is, therefore, improved since only one heat bridge is still present.

In spite of the improvements attained with the phase separator of German Preliminary Application No. 27 43 131, the evaporation losses are still considerable. It is, moreover, disadvantageous that the phase separators with their supply and discharge lines must be constructed in different sizes depending on the required throughput of the low-boiling liquified gas.

It became, furthermore, clear that occasionally violent liquid movements occur in the catch vessel wih the phase separator according to German Preliminary Application No. 27 43 131 so that the connected differential pressure switches and possibly directly used float switches do not always produce exact switching procedures.

SUMMARY OF INVENTION

The invention is, therefore, based on the objective of providing a phase separator which can be used within very broad limits with any size throughput of low-boiling liquified gas and whereby the evaporation losses are reduced to a minimum. The phase separator to be provided should, moreover, present the possibility of reliably preventing violent liquid movements in the catch vessel.

This is attained according to the invention with an apparatus for separating the gas, which evaporates during the transfer of low-boiling liquified gas, consisting of a porous hollow body with a supply line for the gas-liquid mixture to be separated which is arranged inside an insulated vessel which receives the gas and liquid phase emerging from the porous hollow body and which is provided with discharge lines for the gas and liquid phase, when the porous hollow body has a cylindrical shape, concentrically surrounds the discharge line for the liquid phase and is installed in the cover of the insulated vessel by means of a pipe and a non-porous cylindrical extension in such a way that an annular space is formed by the pipe and the cylindrical extension to which the discharge line for the gas phase is connected.

In a preferred embodiment, the supply line for the gas-liquid mixture is connected to the cylindrical extension. Installation of the supply line advantageously takes place tangentially in the cylindrical extension.

In order to reliably prevent violent liquid movements in the catch vessel, the porous hollow body is preferably connected downward with a non-porous cover plate. This prevents that gas mixed with liquid escapes downward at high speed from the porous hollow body and directly strikes the liquid surface in the catch vessel. Violent liquid movements in the catch vessel are, therefore, prevented, differential pressure switches and possibly directly used float switches which are in connection with the liquid surface can, therefore, carry out exact switching procedures.

The advantage of the phase separator according to the invention is that the supply line for the gas-liquid mixture and the discharge line for the gas phase are formed as annular channels in the immediate area of the insulated vessel. These annular channels have very large cross sections in comparison with pipe lines so that the phase separator according to the invention can be used for very different throughputs of low-boiling liquified gas without the limitation of too narrow line cross sections. A further advantage is that an optimal insulation is obtained as a result of the concentric arrangement of the supply and discharge lines, the evaporation losses are, therefore, extremely low.

THE DRAWING

The single FIGURE illustrates an exemplified embodiment of the invention in cross section.

DETAILED DESCRIPTION

The phase separator consists of a porous hollow body 1 which is arranged inside a catch vessel 2 provided with an insulation 3. The catch vessel is used to catch the liquid phase 4 which emerges from the porous hollow body 1. According to the invention, the porous hollow body 1 has a cylindrical shape and has a non-porous cylindrical extension 5. The porous hollow body 1 and the cylindrical extension 5 concentrically surround the discharge line 6 for the liquid phase. Fastening the porous hollow body 1 and its cylindrical extension 5 in the catch vessel 2 takes place according to the invention by means of a pipe 7 which surrounds the cylindrical extension 5 and is connected, on the one hand, to this extension by means of a flange 8 and, on the other hand, to the cover of the catch vessel 2 by means of a flange 9. An annular channel 10 is formed in this way which is used to withdraw the gas phase which is removed from the annular channel 10 by means of the discharge line 11. An annular channel 12 is accordingly formed around the discharge line 6 which is closed downward and upward by means of cover plates 13 and 14. This annular channel 12 is used to supply the gas-liquid mixture to be separated. The mixture to be separated enters through the supply line 15 into the cylindrical extension 5. It is advantageous, especially with large throughputs, when the entrance of the supply line 15 takes place tangentially into the cylindrical extension 5.

The liquid phase is separated from the gas phase in the porous hollow body 1. The liquid phase emerges from the porous hollow body 1 in the form of large drops, falls down and then forms the bath of the liquid phase 4. The gas phase also emerges from the porous hollow body 1, enters the annular channel 10 and is removed through the discharge line 11.

The cover plate 13 prevents according to the invention, however, that a gas flow mixed with liquid emerges directly downward from the porous hollow body 1 and strikes the liquid surface of the liquid phase 4 as a result of which violent liquid movements would be caused. The separation of gas and liquid is improved and the reliable use of differential pressure switches and float switches is made possible by the cover plate 13.

The annular channels 10 and 12 have in comparison with corresponding pipelines a large flow cross section. They can, therefore, accommodate even large amounts of gas.

The phase separator according to the invention is, therefore, equally well suited for small and large throughputs of the gas-liquid mixtures to be separated. Only different size catch vessels 2 must be used. Depending on the size of the vessel 2, a different size plastic pipe 16 is connected to the discharge line 6 through which plastic pipe the liquid phase 4 arrives in the discharge line 6. The universal applicability of the phase separator according to the invention obtained in this way provides a considerable cost savings combined with very low evaporation losses as a result of the reciprocal insulation of the discharge line 6 and the annular channels 10 and 12.

In summary the invention utilized with an apparatus for separating the gas which evaporates during the transfer of low-boiling liquified gases, consisting of a porous hollow body 1 into which the gas-liquid mixture to be separated is introduced as well as of an insulated catch vessel 2 which surrounds the porous hollow body from which catch vessel the gas and liquid phases separated from each other are withdrawn.

In order to improve the insulation and to use the apparatus for very different throughputs, the supply line for the gas-liquid mixture to be separated and the discharge line for the gas phase are formed as annular channels 10, 12 in the immediate area of the insulated vessel. For this purpose, the porous hollow body concentrically surrounds the discharge line 6 for the liquid phase while forming an annular channel 12.

A direct discharge of a gas-liquid flow from the porous hollow body downward is prevented by means of a non-porous cover plate 13. As a result, violent liquid movements in the catch vessel are prevented and the reliable use of differential pressure switches and float switches is possible.

What is claimed is:

1. In an apparatus for separating the gas which evaporates during the transfer of low-boiling liquified gases, including a porous hollow body with a supply line for the gas-liquid mixture to be separated which is arranged inside an insulated vessel which receives the gas and liquid phase emerging from the porous hollow body and which is provided with discharge lines for the gas and liquid phase, the improvement being said porous hollow body having a cylindrical shape, said porous hollow body concentrically surrounding the discharge line for the liquid phase, said porous hollow body being installed in the cover of said insulated vessel by means of a pipe and a non-porous cylindrical extension, and annular space being formed between said pipe and said cylindrical extension, and the discharge line for the gas phase communicating with said annular space.

2. Apparatus according to claim 1, characterized in that the supply line for the gas-liquid mixture is connected to said cylindrical extension.

3. Apparatus according to claim 2, characterized in that said supply line enters tangentially into said cylindrical extension.

4. Apparatus according to claim 3, characterized in that said porous hollow body is closed at its lower end by a non-porous cover plate.

5. Apparatus according to claim 4, characterized in that said pipe includes an upper flange connected to said cylindrical extension and a lower flange connected to said cover, and said cover being open between said lower flange and said porous hollow body to provide communication between said annular space and the interior of said vessel.

6. Apparatus according to claim 1, characterized in that said porous hollow body is closed at its lower end by a non-porous cover plate.

* * * * *